(12) United States Patent
Sridhar et al.

(10) Patent No.: US 9,949,172 B2
(45) Date of Patent: Apr. 17, 2018

(54) TECHNIQUES FOR HANDOUT OF AN ACTIVE SESSION FROM A FIRST NETWORK TO A SECOND NETWORK

(71) Applicant: Taqua WBH, LLC, Richardson, TX (US)

(72) Inventors: Anuradha Sridhar, Plano, TX (US); Matthew Christopher Perry, Plano, TX (US); Rajiv Harish Patel, Newark, CA (US); Satish Agarwal, San Jose, CA (US); Shan Jen Chiou, Plano, TX (US)

(73) Assignee: Sonus Networks, Inc., Westford, MA (US)

( * ) Notice: Subject to any disclaimer, the term of this patent is extended or adjusted under 35 U.S.C. 154(b) by 77 days.

(21) Appl. No.: 15/015,964

(22) Filed: Feb. 4, 2016

(65) Prior Publication Data

US 2016/0234727 A1    Aug. 11, 2016

Related U.S. Application Data

(60) Provisional application No. 62/112,565, filed on Feb. 5, 2015.

(51) Int. Cl.
*H04W 36/24* (2009.01)
*H04W 36/00* (2009.01)
(Continued)

(52) U.S. Cl.
CPC ..... *H04W 36/0022* (2013.01); *H04L 65/1069* (2013.01); *H04W 36/0094* (2013.01); *H04W 36/24* (2013.01); *H04W 36/14* (2013.01)

(58) Field of Classification Search
CPC ............... H04L 65/1069; H04L 29/06; H04W 36/0022; H04W 36/24; H04W 36/14; H04W 36/0094
See application file for complete search history.

(56) References Cited

U.S. PATENT DOCUMENTS

2005/0047435 A1    3/2005 Segal et al.
2006/0116127 A1*   6/2006 Wilhoite ........... H04M 3/42246
                                                        455/442

(Continued)

OTHER PUBLICATIONS

International Search Report Issued for PCT/US2016/016805, dated May 2, 2016, 8 pages.

*Primary Examiner* — Lakeram Jangbahadur
(74) *Attorney, Agent, or Firm* — Straub & Straub; Stephen T. Straub; Michael P. Straub

(57) ABSTRACT

A method includes establishing a first session (e.g., a Wi-Fi call) via a first connection to a first network, where the connection to the first network is provided by a first receiver of the mobile device, and monitoring a characteristic of the first connection to the first network. The method includes determining whether the characteristic satisfies a threshold. When the characteristic does not satisfy the threshold, the method includes activating a second receiver of the mobile device, establishing a second connection to a second network, and initiating a handover procedure to transfer the first session from the first network to the second network. The second connection to the second network is provided by the second receiver of the mobile device. As a result of the handover procedure, the first session may be merged with or transferred to a second session (e.g., a cellular call) provided via the second network.

29 Claims, 9 Drawing Sheets

(51) Int. Cl.
*H04L 29/06* (2006.01)
*H04W 36/14* (2009.01)

(56) References Cited

U.S. PATENT DOCUMENTS

| | | |
|---|---|---|
| 2007/0015536 A1 | 1/2007 | LaBauve et al. |
| 2007/0201403 A1 | 8/2007 | Thome |
| 2011/0165856 A1* | 7/2011 | You .................. H04W 36/0022 455/404.1 |
| 2014/0362713 A1* | 12/2014 | Agarwal ............... H04W 24/08 370/252 |

* cited by examiner

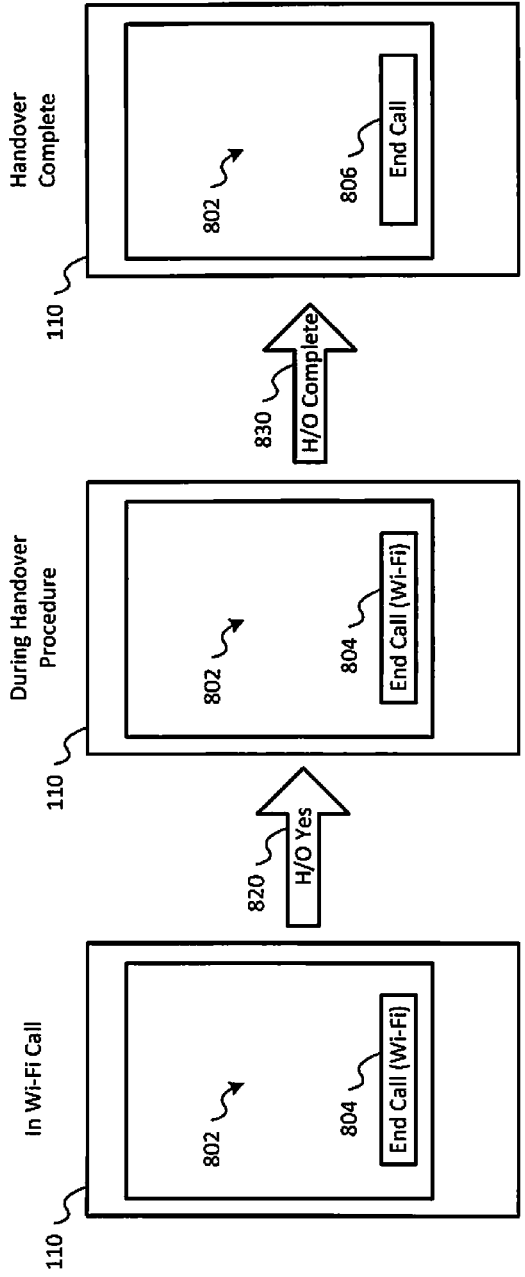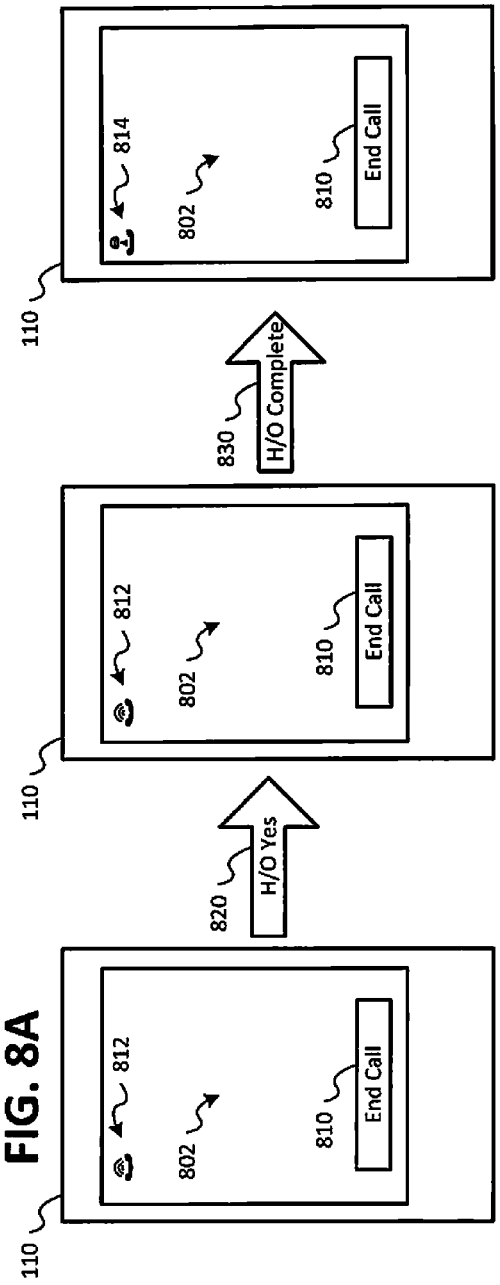

TECHNIQUES FOR HANDOUT OF AN ACTIVE SESSION FROM A FIRST NETWORK TO A SECOND NETWORK

CROSS-REFERENCE TO RELATED APPLICATIONS

This application claims the benefit of U.S. Provisional Patent Application No. 62/112,565, entitled, "TECHNIQUES FOR HANDOUT OF AN ACTIVE SESSION FROM A FIRST NETWORK TO A SECOND NETWORK," filed on Feb. 5, 2015, the content of which is expressly incorporated by reference herein in its entirety.

TECHNICAL FIELD

The present disclosure is generally related to mobile communications, and, more particularly, to systems, apparatuses, and methods for initiating handover of an active session from a first network to another network.

BACKGROUND

As mobile devices increase in processing power, the number of services provided by the mobile devices has also increased. The services provided by mobile devices include voice services, multimedia services, messaging services, and the like, and the use of such services may result in high utilization of cellular networks (e.g., cellular data networks) resources. To ease the burden on cellular network infrastructure, many mobile devices are operable to establish connections to various types of networks, such as cellular networks (e.g., $2^{nd}$ Generation (2G) networks, $3^{rd}$ Generation (3G) networks) and wireless fidelity (Wi-Fi) networks. A mobile device may establish an active Wi-Fi session via a Wi-Fi network, and a service may be provided to the mobile communication devices via active Wi-Fi session and the Wi-Fi network, rather than the cellular network. Thus, demand for cellular network resources may be reduced by providing services to the mobile devices via Wi-Fi networks, rather than the cellular network.

However, Wi-Fi networks tend to have smaller coverage areas (e.g., a building or a portion of a building) than cellular network coverage areas, which may cover an entire metropolitan area. As the mobile devices are moved around, they may periodically move into and out of a coverage area of one or more Wi-Fi networks. If the mobile device initiates use of a service via an active Wi-Fi session while within the coverage area of a Wi-Fi network, and then subsequently moves outside of the coverage area of the Wi-Fi network during the active Wi-Fi session, the session may terminate, which may result in loss of data or otherwise make the use of the service at the mobile device a frustrating experience for the user. Thus, although the use of multiple networks to provide services to a mobile device has reduced the demand for resources on the cellular network, the provisioning of such services to the mobile devices via Wi-Fi and cellular networks may not provide a seamless user experience, which may be frustrating for users of the mobile devices.

SUMMARY

Systems, methods, apparatuses, and computer-readable storage media providing techniques for providing handover of a session from a first network to a second network according to embodiments are disclosed. In an embodiment, the session may be a Wi-Fi call from a mobile device to a remote device via a Wi-Fi network, and the Wi-Fi call may be handed over to a cellular network while maintaining voice continuity for the call. In an embodiment, when the mobile device is coupled to the first network, the mobile may deactivate all or a portion of a receiving unit used to communicate with the second network to reduce battery consumption, and may monitor a characteristic of the connection to the first network. The mobile device may periodically determine whether the characteristic of the connection satisfies a threshold, and may initiate the handover operation when the characteristic of the connection fails to satisfy the threshold. In an embodiment, the mobile device may activate at least a portion of the receiving unit used to communicate with the second network when the characteristic of the connection fails to satisfy the threshold, where the second receiving unit may be used to establish a media path via the second network, wherein the handover operation transfers the session from the first network to the media path provided via the second network.

In an embodiment, a path for providing the session via the first network and a path established for handing over the session to the second network may share a common remote leg. For example, the path for providing the session via the first network may include communication with a media gateway (MGW) and the path for providing the session via the second network may also include communication with the MGW. Thus, a path from the MGW to the remote device may be common to both paths, and the handover operations may include switching an active path for the session from the path from the mobile device to the MGW through the first network to the path from the mobile device to the MGW through the second network. By only switching the path from the mobile device to the MGW, an amount of control signaling required to complete the handover operation may be reduced, and the handover operation may be completed with a reduced audio gap (e.g., the time between switching from the path from the mobile device to the MGW through the first network to the path from the mobile device to the MGW through the second network.

Additionally, the techniques for providing handover of the session from the first network to the second network according to embodiments may be based on standards defining operations of the mobile device in relation to communication via the second network (e.g., cellular communication standards). By providing a standards based approach for providing handover of the session from the first network to the second network, the techniques for providing handover of the session from the first network to the second network may be utilized by any standards based mobile device and/or a downloadable client. Thus, the handover techniques of embodiments provide a robust solution for providing handover of the session from the first network to the second network.

The foregoing has outlined rather broadly the features and technical advantages of the present disclosure in order that the detailed description that follows may be better understood. Additional features and advantages of the embodiments will be described hereinafter which form the subject of the claims of the disclosure. It should be appreciated by those skilled in the art that the conception and specific embodiments disclosed may be readily utilized as a basis for modifying or designing other structures for carrying out the same purposes of the present disclosure. It should also be realized by those skilled in the art that such equivalent constructions do not depart from the scope of the disclosure as set forth in the appended claims. The novel features which are believed to be characteristic of the embodiments of the disclosure, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

For a more complete understanding of the embodiments of the present disclosure, reference is now made to the following descriptions taken in conjunction with the accompanying drawings, in which:

FIG. 8A is an exemplary embodiment of a user interface that may be presented to a user of a mobile device during a handover of a session from a first network to a second network according to embodiments;

FIG. 8B is an exemplary embodiment of a user interface that may be presented to a user of a mobile device during a handover of a session from a first network to a second network according to embodiments.

DETAILED DESCRIPTION

Figure 1:
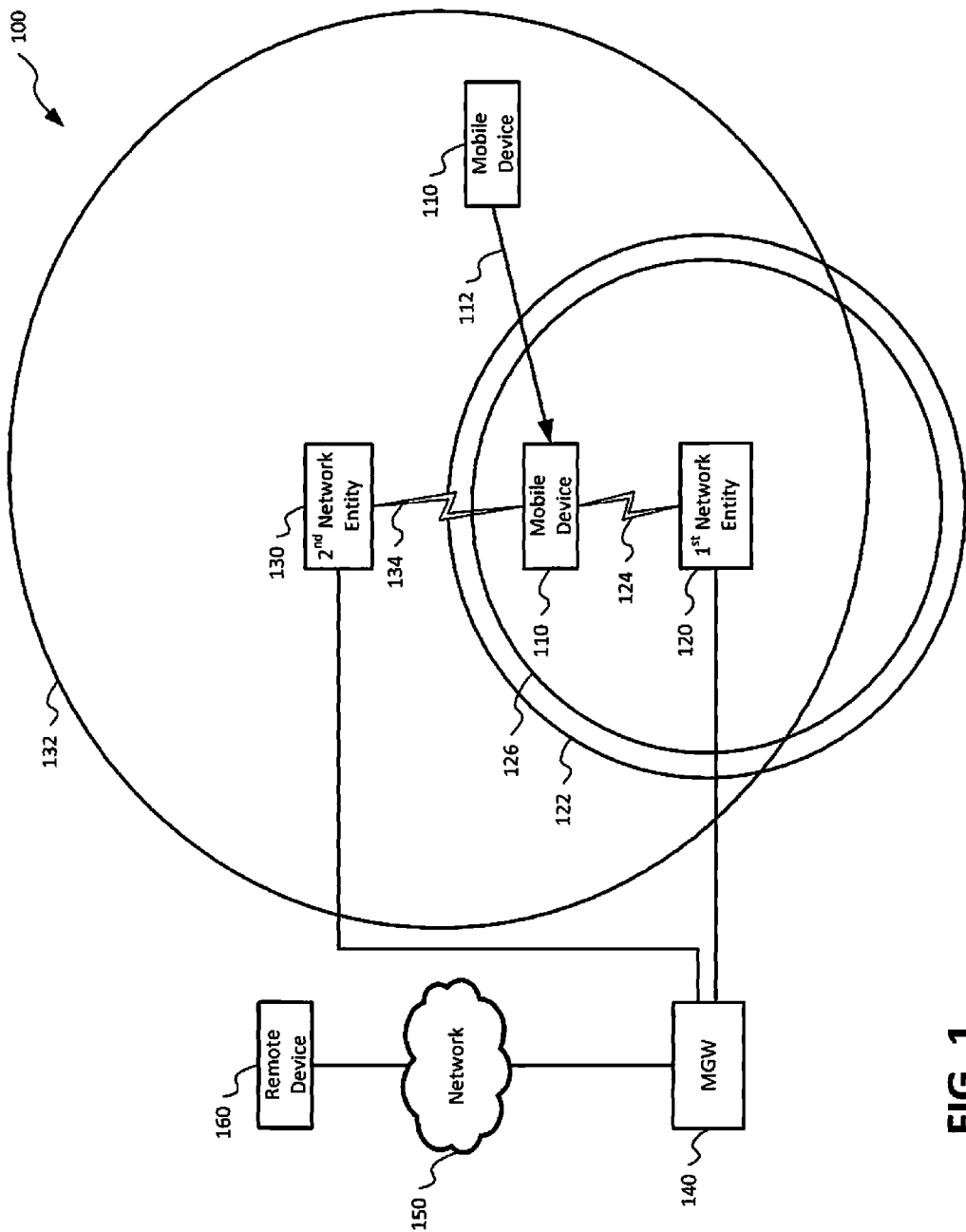
FIG. 1 is a block diagram of a system for providing services to a mobile device via two or more networks according to embodiments.

Referring to FIG. 1, a block diagram of a system for providing services to a mobile device via two or more networks according to embodiments is shown as a system 100. As shown in FIG. 1, the system 100 includes a first network entity 120, a second network entity 130, a media gateway (MGW) 140, and a network 150. Various components of the system 100 may be adapted to provide services to one or more mobile devices, such as a first mobile device 110 and a second mobile device 160, as described in more detail below.

The first network entity 120 may include a processor and a memory. The memory may include random access memory (RAM), read only memory (ROM), flash memory, one or more hard disk drives (HDDs), one or more solid state drives (SSDs), erasable programmable ROM (EPROM), electrically erasable programmable ROM (EEPROM), other forms of memory configured to store information in a persistent and/or non-persistent state, or a combination thereof. In an embodiment, the memory may store instructions that, when executed by the processor, cause the processor to initiate and/or perform the operations described in connection with the first network entity 120 with reference to FIGS. 1-9. The first network entity 120 may include a wireless transmitter and a wireless receiver (or a wireless transceiver) adapted to transmit and receive signals, and may be adapted to communicate with mobile devices via wired and/or wireless connections or links. For example, in FIG. 1, the first network entity 120 is communicatively coupled to the first mobile device 110 via a first wireless connection 124.

The first network entity 120 may adapted to provide mobile devices, such as the first mobile device 110, that are within a coverage area 122 of the first network entity 120 with access to the first network (not shown in FIG. 1). In an embodiment, the first network may be provided by a plurality of network entities that includes the first network entity 120. For example, the first network entity 120 may be one of a plurality of network entities providing a wireless local area network (WLAN). In an embodiment, the first network may be packet switched (PS) network operating according to one or more standards or protocols (e.g., an interne protocol (IP) standard or protocol). For example, the first network may be a wireless fidelity (Wi-Fi) network, and mobile devices, such as the first mobile device 110, when connected to the Wi-Fi network via the first network entity 120, may place and/or receive voice over Wi-Fi (VoWiFi) calls or VoIP calls via the first network. In an embodiment, the first network entity 120 may be a femtocell or a pico cell.

The second network entity 130 may include a processor and a memory. The memory may include RAM, ROM, flash memory, one or more HDDs, one or more SSDs, EPROM, EEPROM, other forms of memory configured to store information in a persistent and/or non-persistent state, or a combination thereof. In an embodiment, the memory may store instructions that, when executed by the processor, cause the processor to initiate and/or perform the operations described in connection with the second network entity 130 with reference to FIGS. 1-9. The second network entity 130 may include a wireless transmitter and a wireless receiver (or a wireless transceiver) adapted to transmit and receive signals, and may be adapted to communicate with mobile devices via wired and/or wireless connections or links. For example, in FIG. 1, the second network entity 130 may be communicatively coupled to the first mobile device 110 via a second wireless connection 134.

The second network entity 130 may adapted to provide mobile devices, such as the first mobile device 110, that are within a coverage area 132 of the second network entity 130 with access to a second network (not shown in FIG. 1). In an embodiment, the second network may be a cellular network (e.g., a $2^{nd}$ Generation (2G) cellular network or a $3^{rd}$ Generation (3G) cellular network, etc.) provided by a plurality of network entities that includes the second network entity 130. In an embodiment, the second network may be circuit switched (CS) network operating according to one or more standards or protocols (e.g., 2G or 3G standard or protocol, etc.). Mobile devices, such as the first mobile device 110, when connected to the cellular network via the second network entity 130, may place and/or receive voice calls and initiate and/or receive data transfers (e.g., text messages, multimedia streaming/download, etc.) via the cellular network.

A database (not shown in FIG. 1) may be accessible to the second network entity 130, and may store information associated with mobile devices that are associated with users having a subscription with the second network and/or an operator of the second network, as described in more detail below. In an aspect, the database may be stored at the memory of the second network entity 130. In an additional or alternative aspect, the database may be stored external to the second network entity 130 and may be accessed by the second network entity 130 via a wired or wireless communication link.

It is noted that the first network and the second network may include additional components not shown in FIG. 1 for simplicity of the drawing. For example, in an embodiment, the first network (e.g., the network provided by the first network entity 120) and/or the second network (e.g., the network provided by the second network entity 130) may include or be communicatively coupled to one or more of: an authentication, authorization, and accounting (AAA) server, a session border controller (SBC), a media resource function server (MRF), a media gateway control function (MGCF), a signaling transfer point (STP), a short message service center (SMS-C), an interexchange network (IN), and a mobile switching center (MSC), a visiting location register (VLR), a home location register (HLR), a convergence server (CS), a call session control function (CSCF), and/or other components utilized to provide the first network and the second network.

As shown in FIG. 1, the first network entity 120 and the second network entity 130 may be communicatively coupled to the media gateway (MGW) 140. The MGW 140 may translate streams communicated between disparate networks. To illustrate, in an embodiment, the network 150 may be a public switched telephone network (PSTN), and the MGW 140 may translation services that enable communications received from the network 150 to be routed to mobile devices coupled to the first network (e.g., a Wi-Fi network) provided by the first network entity 120 and the second network (e.g., 2G and 3G cellular networks) provided by the second network entity 130. For example, the MGW 140 may enable a mobile terminated (MT) call received from the network 150 from the second mobile device 160 to be routed to the first mobile device 110 via the first network or the second network, or may enable a mobile originated (MO) call placed by the first mobile device 110 via the first network or the second network to be routed to the second mobile device 160 via the network 150. In an embodiment, the MGW 140 may be communicatively coupled to and/or controlled by a media gateway controller (not shown in FIG. 1), such as a media gateway control function (MGCF).

The first mobile device 110 may be a wireless communication device, such as a smartphone, a cellular phone, a tablet computing device, a laptop computing device, a mobile communication device, a personal digital assistant (PDA), or another electronic device configured to communicate with a plurality of different types of networks, such as a Wi-Fi network and a cellular network. In operation according to embodiments, the mobile device 110 may be configured to initiate handover of an active session (e.g., an active call) from a first network to a second network, as described in more detail below. The mobile device 110 may include a processor and a memory. The memory may include RAM, ROM, flash memory, one or more HDDs, one or more SSDs, EPROM, EEPROM, other forms of memory configured to store information in a persistent and/or non-persistent state, or a combination thereof. In an embodiment, the memory may store instructions that, when executed by the processor, cause the processor to initiate and/or perform the operations described in connection with the first mobile device 110 with reference to FIGS. 1-9.

In an embodiment, the mobile device 110 may be configured to send and receive wireless signals using a plurality of radio access technologies (RATs) and a plurality of communication protocols (e.g., a 2G cellular communications protocol, a 3G cellular communications protocol, a 4G/LTE communications protocol, an IP protocol, an 802.11 communications protocol, another wired or wireless communication protocol, or a combination thereof). For example, the first mobile device 110 may include a first receiving unit (e.g., a Wi-Fi transmitter and receiver) configured to communicate with the first network, and a second receiving unit (e.g., a cellular transmitter and receiver, a 1× radio transmitter and receiver, etc.) configured to communicate with the second network (e.g., the cellular network).

The second mobile device 160 may be a wireless communication device, such as a wireless home phone, a smartphone, a cellular phone, a tablet computing device, a laptop computing device, a mobile communication device, a personal digital assistant (PDA), or another electronic device configured to communicate with one or more networks, such as the network 150. In operation according to embodiments, the second mobile device 160 may be adapted to participate in VoWiFi calls with the first mobile device 110. The second mobile device 160 may include a processor and a memory. The memory may include RAM, ROM, flash memory, one or more HDDs, one or more SSDs, EPROM, EEPROM, other forms of memory configured to store information in a persistent and/or non-persistent state, or a combination thereof. In an embodiment, the memory may store instructions that, when executed by the processor, cause the processor to initiate and/or perform the operations described in connection with the second mobile device 160 with reference to FIGS. 1-9.

During operation according to an embodiment, the first mobile device 110 may enter the coverage area 132 of the second network entity 130, and may establish a connection 134 to the second network (e.g., a cellular network) via the second network entity 130. Subsequently, the first mobile device 110 may move, as indicated by the arrow 112, within the coverage area 122 of the first network entity 120, and may establish a connection 124 to the first network (e.g., a Wi-Fi network) via the first network entity 120. For example, the first network may be a Wi-Fi network located within a structure (e.g., a building, a stadium, a home, etc.), and a user of the first mobile device 110 may be located outside of the structure. Upon entering the structure, at 112, the first mobile device 110 may enter the coverage area 122 of the first network entity 120 and may establish the connection 124.

While communicatively coupled to the first and second networks, the first mobile device 110 may initiate MO communications, and may receive MT communications via the first and second networks, respectively. For example, the first mobile device 110 may initiate or receive a cellular voice call via the second network, and may also initiate or receive a voice call (e.g., a VoWiFi call) via the first network. Additionally, the first mobile device may be adapted to send and receive data via the first network and/or the second network. The first mobile device 110 may be configured to use the first network for data communications (e.g., multimedia streaming/downloading, etc.) rather than the second network when the connection 124 is available. This may reduce consumption of a data plan associated with the user's subscription with a service provider (e.g., a cellular service provider) providing the second network.

In an embodiment, the first mobile device 110 may deactivate the second receiving unit (e.g., the cellular network receiving unit) of the first mobile device 110 in response to establishing the connection 124 to the first network. For example, in an embodiment, deactivating the second receiving unit may include ceasing to provide operational power to the second receiving unit (e.g., both the cellular transmitter and the cellular receiver). In an additional or alternative embodiment, deactivating the second receiving unit may include ceasing to provide operational power to the transmitter of the second receiving unit. In such instances, the receiver of the second receiving unit may remain operational to receive and monitor signals transmitted by the second network entity 130 and/or other network entities operating within the second network. In yet another additional or alternative embodiment, deactivating the second receiving unit may include not processing signals received from the second network entity 130 and/or other network entities operating within the second network. By deactivating the second receiving unit (or at least a portion of the second receiving unit), power consumption of the first mobile device 110 may be reduced, thereby increasing an amount of time before a battery of the mobile device 110 needs to be charged. Additionally, when only a portion (e.g., the cellular transmitter) of the second receiving unit is deactivated, the first mobile device 110 may continue to monitor one or more characteristics of signals transmitted by the second network entity 130 and/or other network entities operating within the second network, while reducing power consumption (e.g., because the transmitter is not receiving operational power and transmitting signals).

The first mobile device 110 may establish a first session via the connection 124 to the first network. The connection 124 to the first network may be provided by the first receiving unit (e.g., the Wi-Fi receiving unit) of the mobile device 110. In an embodiment, the first session may be a VoWiFi call initiated by or received at the first mobile device 110. For example, the first session may be a VoWiFi call from the first mobile device 110 to the second mobile device 160, where the VoWiFi call is provided or routed via the first network. In an additional or alternative embodiment, the first session may be a multimedia session. For example, the first session may be a video or music streaming session initiated by the first mobile device 110, where the multimedia content is streamed to the first mobile device 110 from a multimedia server (not shown in FIG. 1) via the first network. The first session may be provided via a first bearer path.

Figure 2:
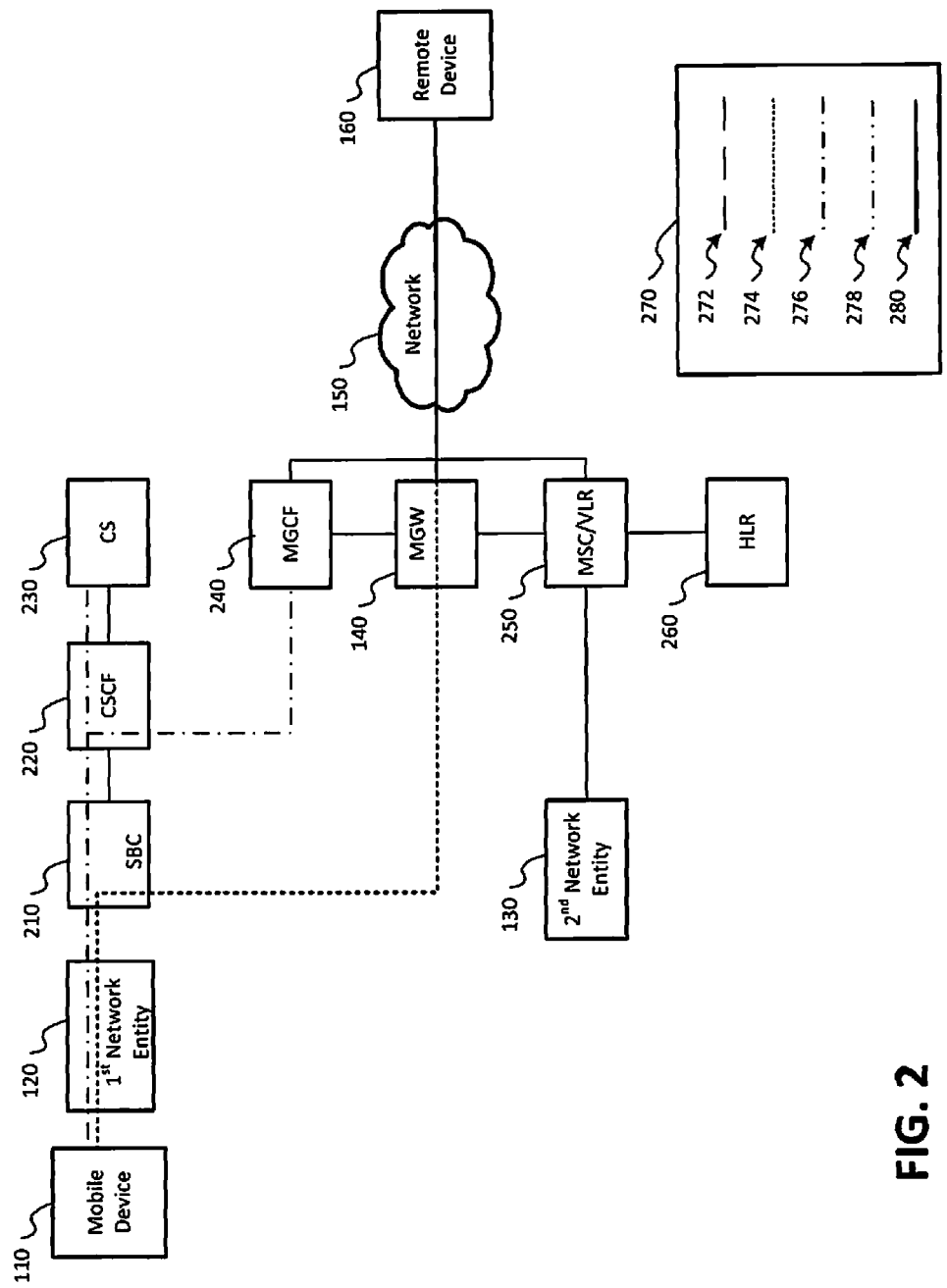
FIG. 2 is a block diagram illustrating a signaling path and a bearer path for a session initiated via one of a plurality of networks according to embodiments.

To illustrate, and with reference to FIG. 2, a block diagram illustrating a signaling path and a bearer path for a session initiated via one of a plurality of networks according to embodiments is shown. In FIG. 2, the first mobile device 110, the first network entity 120, the second network entity 130, the MGW 140, the network 150, and the second mobile device 160 of FIG. 1 are shown. Additionally, in FIG. 2, a session border controller (SBC) 210, a call session control function (CSCF) 220, a convergence server 230, a media gateway control function 240, a mobile switching center (MSC) 250, a home location register 260, and a legend 270 that identifies various paths that may be used to provide the session (e.g., the first session described with reference to FIG. 1) to the first mobile device 110 via the first network entity 120 are shown.

In FIG. 2, a first signaling path 272 and a first bearer path 274 are shown. The first signaling path 272 may be used to exchange control messages (e.g., call setup messages, resource reservation messages, etc.) between the first mobile device 110, the CSCF 220, the CS 230, and the MGCF 240 via the first network (e.g., the WiFi network provided by the first network entity 120). For example, when the first session is a VoWiFi call, the first signaling path 272 may be used to establish the first bearer path 274 between the first mobile device 110 and the second mobile device 160, where the VoWiFi call is provided via the first network via the first bearer path 274. As shown in FIG. 2, in an embodiment, the first bearer path 274 may be a path from the first mobile device 110 to the MGW 140 via the first network entity 120 and may include a remote leg 280 that begins at the MGW 140 and terminates at the second mobile device 160. Additional features regarding the signaling and bearer paths according to embodiments are described below with reference to FIGS. 3 and 4.

Referring back to FIG. 1, the first mobile device 110 may monitor a characteristic of the connection 124 to the first network during the first session. For example, in an embodiment, upon detecting that the first session is active (e.g., the VoWiFi call has been answered by the second mobile device 160), the first mobile device 110 may monitor a characteristic of the connection 124 to determine whether the characteristic satisfies a threshold. In an additional or alternative embodiment, the first mobile device 110 may monitor the characteristic of the connection 124 continuously or periodically after the connection 124 is established. The characteristic of the connection 124 may include a received signal strength indication (RSSI) associated with the first network, a bit error rate (BER) associated with the first network, a link quality indicator (LQI) associated with the first network, a data rate provided via the first connection 124, a signal to noise ratio (SNR) associated with the connection 124, or a combination thereof. In an embodiment, the threshold may be a value representative of characteristic that indicates the connection 124 provides a minimum quality of service (QoS) (e.g., a minimum SNR value, a maximum BER, a minimum RSSI value, a minimum data rate, etc.) with respect to the first session. In an embodiment, the threshold value associated with the threshold may be configurable.

In an embodiment, one or more thresholds selected from a plurality of thresholds may be utilized by the first mobile device 110. For example, a first threshold may be associated with a maximum BER, a second threshold may be associated with a minimum SNR, a third threshold may be associated with a minimum data rate, a fourth threshold may be associated with a minimum RSSI, etc., and the first mobile device 110 may monitor one or more characteristics of the connection 124 to determine whether each of the one or more characteristics satisfies a corresponding threshold. For example, a multimedia streaming session (e.g., a video or multimedia call, a video streaming session, a music streaming session, a video chat session, etc.) may require a minimum data rate to provide the user of the first mobile device 110 with an acceptable user experience (e.g., good picture quality, sound quality, etc.), while a VoWiFi or VoIP session may require the same or different threshold characteristics to provide an acceptable user experience (e.g., good voice continuity, etc.). Thus, in an embodiment, the first mobile device 110 may determine the one or more characteristics to monitor during the session based on a type of the session (e.g., whether the session is a VoWiFi call, a multimedia streaming session, etc.), and may determine a set of one or more thresholds corresponding to the one or more monitored characteristics. In an embodiment, the threshold (s) associated with a particular type of session, and the threshold value(s) associated with each threshold may be configurable.

In response to a determination that the characteristic does not satisfy the threshold, the first mobile device 110 may initiate operations to determine whether an alternative network is available to continue the first session. For example, in FIG. 1, an intermediate coverage area 126 is shown. The intermediate coverage area 126 may correspond to a point at which the characteristics of the connection 124 begin to not satisfy the threshold(s). For example, when the first mobile device 110 is within the intermediate coverage area, the one or more characteristics of the connection 124 may satisfy the threshold(s) (e.g., provide a minimum QoS with respect to the first session). As the first mobile device 110 crosses a boundary of the intermediate coverage area 126 and approaches a boundary of the coverage area 122, the quality of the connection 124 may begin to deteriorate due to interference (e.g., interference caused by signals from the second network entity or from other network entities, interference caused by structures, etc.), weak signal strength (e.g. low RSSI), etc. As the quality of the connection deteriorates (e.g., as the first mobile device 110 travels further from the first network entity 120), the likelihood that the first session will be dropped increases. Thus, when the characteristic does not satisfy the threshold, the first mobile device 110 may determine that the first session is at risk of being dropped (e.g., that the first mobile device is approaching the intermediate coverage area 126 or is between the boundary of the intermediate coverage area 126 and the boundary of the coverage area 122), and may initiate operations to determine whether an alternative network is available, and whether the first session may be handed over to the alternative network.

In an embodiment, the operations to determine whether an alternative network is available may include accessing information representative of a characteristic of a previous connection between the first mobile device 110 and the second network entity 130 to determine whether the characteristic satisfies a threshold. For example, upon deactivating the second receiving unit, the first mobile device 110 may store the information representative of the characteristic of the previous connection between the first mobile device 110 and the second network entity 130 at the memory of the first mobile device 110. When the first mobile device 110 determines that a session (e.g., a Wi-Fi session) provided via the first network (e.g., the Wi-Fi network) is at risk of being dropped, as described above, the first mobile device may access the stored information and determine whether to activate the second receiving unit based on the information representative of the characteristic. For example, when the information indicates that the characteristic of the previous connection between the first mobile device 110 and the second network entity 130 provides a good connection (i.e., the current session would not be dropped if provided by a connection between the first mobile device 110 and the second network entity 130 as indicated by the information), the first mobile device 110 may activate the second receiving unit and initiate a connection to the second network. In an embodiment, activating the second receiving unit may include providing operational power to the second receiving unit (e.g., providing operational power to both the transmitter and receiver of the second receiving unit). In an additional or alternative embodiment, activating the second receiving unit may include activating a transmitter of the second receiving unit (e.g., providing operational power to the transmitter of the second receiving unit). In yet another additional or alternative embodiment, activating the second receiving unit may include initiating processing of signals received by the receiver of the second receiving unit (e.g., when deactivating the second receiving unit causes the signals received at the receiver to not be processed).

Upon activating the second receiving unit, the first mobile device 110 may determine whether an alternative network is available. As shown in FIG. 1, the mobile device 110 may or may not be within the coverage area 132 provided by the second network entity 130. For example, if the first mobile device 110 initiates the operations to determine whether an alternative network is available while within the coverage area 122 but outside the coverage area 132 (e.g., along the lower portion of the coverage area 122 that is outside the coverage area 132), the first mobile device 110 may determine that an alternative network is not available. In such instances, the first mobile device 110 may be adapted to prompt the user of the first mobile device 110 that the first session is at risk of being dropped. For example, the first mobile device 110 may prompt the user by playing a sound, presenting an alert message on a display of the first mobile device, or another action.

If the first mobile device 110 initiates the operations to determine whether an alternative network is available while within both the coverage area 122 and the coverage area 132, the first mobile device 110 may determine that an alternative network (e.g., the second network provided by the second network entity 130) is available. In response to a determination that an alternative network is available, the first mobile device 110 may establish (or re-establish) the connection 134 to the second network using the second receiving unit. In an embodiment, the first mobile device 110 may determine that a plurality of alternative networks are available, and may select a particular alternative network of the plurality of alternative networks to continue the first session. In an embodiment, the first mobile device 110 may select the particular alternative network based on a characteristic associated with signals received at the second receiving unit from each of the plurality of alternative networks. The characteristic associated with the signals received from the alternative networks may include an RSSI, a BER, a LQI, a data rate, whether carrier aggregation is supported, other characteristics, or a combination thereof. In response to selecting the particular alternative network, the first mobile device 110 may establish a connection to the particular alternative network.

In an embodiment, a two-tiered threshold may be used to initiate the handover operations. For example, when the characteristic of the connection 124 fails to satisfy a first threshold of the two-tiered threshold, the first mobile device 110 may activate the second receiving unit and begin determining whether a second network is available, and when the characteristic of the connection 124 fails to satisfy a second threshold of the two-tiered threshold, the first mobile device 110 may initiate the handover operation. The first threshold may be configured to allow sufficient time to identify the second network, and/or to acquire a connection to the second network prior to the session being dropped.

Upon establishing the connection 134 (or a connection to another alternative network), the first mobile device 110 may initiate a handover procedure to handover the first session from the first network to the second network according to embodiments. In an embodiment, the handover procedure may include initiating, by the first mobile device 110, a second session via the connection 134 and the second network. In an embodiment, the second session may be initiated using address information received at the first mobile device 110 upon establishing the first session (e.g., during a session setup process). For example, the first session may be established via an exchange of messages or signaling between the first mobile device 110 and a convergence server (CS) (not shown in FIG. 1). The CS may integrate the first network (e.g., an IP network) provided by the first network entity 120 with the second network (e.g., a cellular network) provided by the second network entity 130 and/or one or more other networks, such as the network 150. The CS may be configured with address information that may be used to perform handover of a session from the first network to the second network. In an embodiment, the address information may be a session transfer number (STN) assigned to the CS, and the STN may be communicated to the first mobile device 110 upon initiating the first session. In an additional or alternative embodiment, the address information may be a particular STN selected from a range of STNs assigned to the CS, and the particular STN may be communicated to the first mobile device 110 upon initiating the first session. The STN may be used by the CS to identify a particular session that is to be handed over to another network, and may be used to reserve resources (e.g., a bearer path) of the second network for handing over the first session to the second network.

Figure 3:
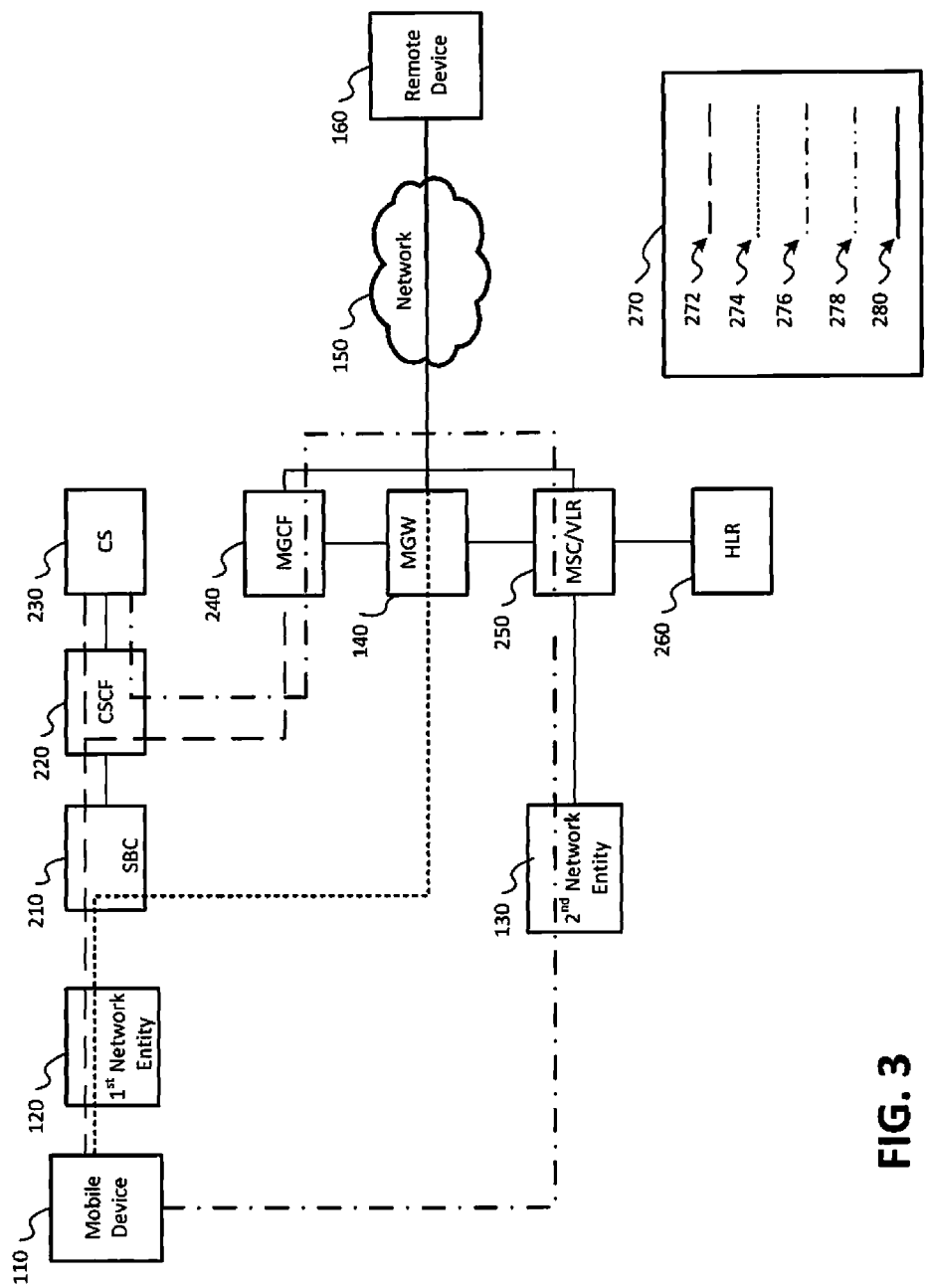
FIG. 3 is a block diagram illustrating signaling paths and a bearer path for sessions initiated via a plurality of networks according to embodiments.

For example, referring to FIG. 3, a block diagram illustrating signaling paths and a bearer path for sessions initiated via a plurality of networks according to embodiments is shown. In FIG. 3, the first mobile device 110, the first network entity 120, the second network entity 130, the MGW 140, the network 150, and the second mobile device 160 of FIG. 1 are shown. Additionally, in FIG. 3, the SBC 210, the CSCF 220, the CS 230, the MGCF 240, the MSC 250, the HLR 260, the legend 270, the first signaling path 272, the first bearer path 274, and the remote leg 280 of FIG. 2 are shown. Additionally, in FIG. 3, a second signaling path 276 between the mobile device 110 and the CS 230 via the second network is shown. The second signaling path 276 may be used to exchange control messages (e.g., call setup messages, resource reservation messages, etc.) between the first mobile device 110, the first network entity 120, the CSCF 220, the CS 230, the MGCF 240, and the MSC 250 via the second network (e.g., the cellular network provided by the second network entity 130). In an embodiment, the control messages may be used to establish a second bearer path from the mobile device 110 to the second mobile device through the second network via the second network entity, as described with reference to FIG. 3.

For example, the first mobile device 110 may initiate the second session by transmitting a call setup request to the second network entity 130, where a called party number (CdPN) included in the call setup request may be set to the STN provided to the first mobile device 110 by the CS 230. The second network entity 130 may transmit one or more messages including the STN to the MSC 250, and the MSC 250 may transmit one or more messages (e.g., an initial address message (IAM), etc.) to the MGCF 240. In response to receiving the one or more messages from the MSC 250, the MGCF 240 may determine the CdPN associated with the second session. As explained above, the CdPN may be set to the STN provided to the first mobile device 110 by the CS 230. The MGCF 240 may recognize the STN as having been assigned to the CS 230, and may transmit one or more messages (e.g., an invite message, etc.) to the CS 230. The one or more messages provided to the CS 230 by the MGCF 240 may include a trigger to the CS 230 that the first session is being handed over to the second network. Upon detecting the trigger at the CS 230, the CS 230 may transmit one or more messages (e.g., a session initiation protocol (SIP) INFO message, etc.) to the first mobile device 110 via the second signaling path 276, and may serve as a trigger to the first mobile device to switch an audio path (e.g., a bearer path) to a bearer path provided via the second network entity 130 and the second network.

Figure 4:
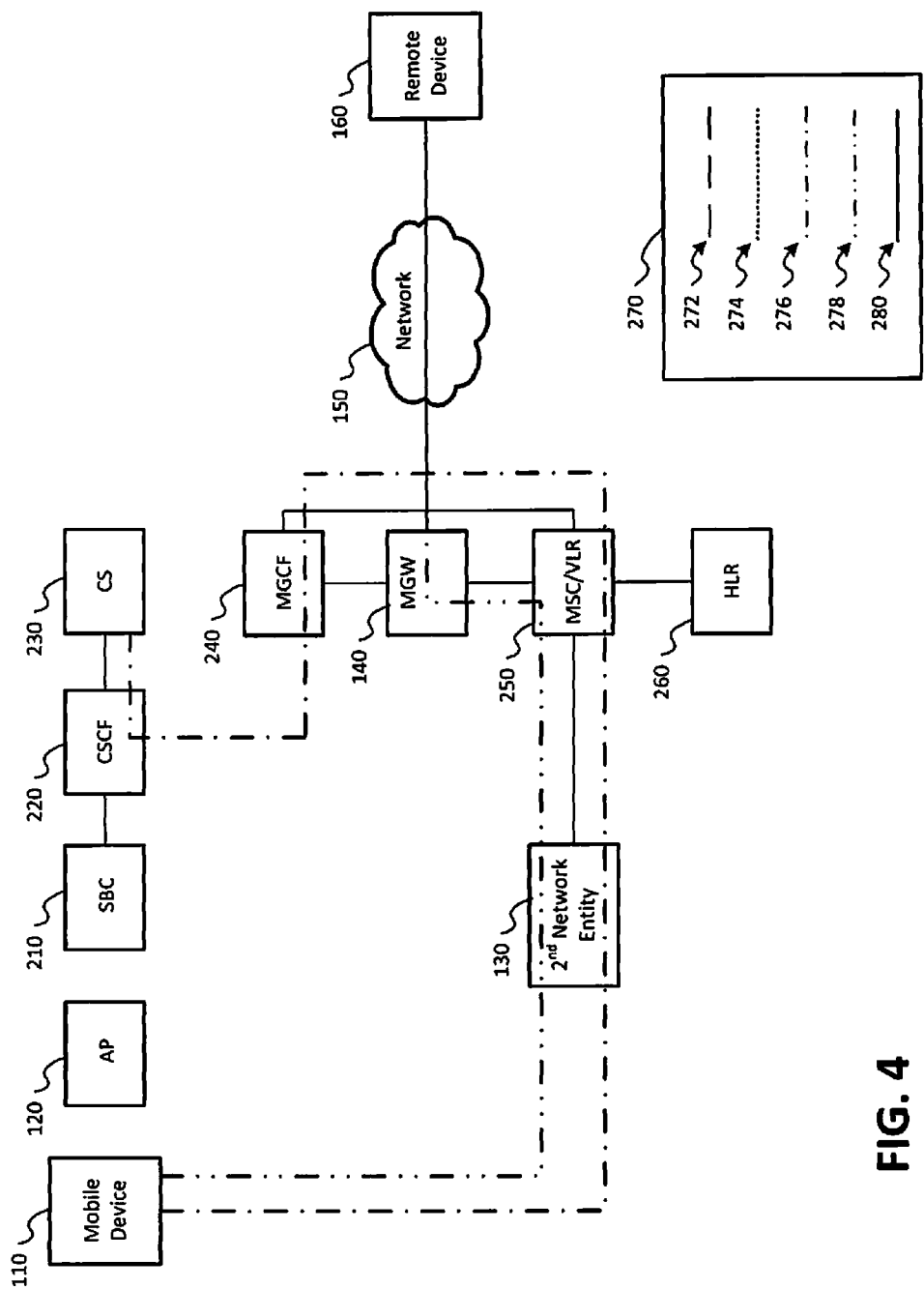
FIG. 4 is a block diagram illustrating signaling paths and bearer paths for sessions initiated via a plurality of networks according to embodiments.

For example, referring to FIG. 4, a block diagram illustrating signaling and bearer paths for sessions initiated via a plurality of networks according to embodiments is shown. In FIG. 4, the first mobile device 110, the first network entity 120, the second network entity 130, the MGW 140, the network 150, and the second mobile device 160 of FIG. 1 are shown. Additionally, the SBC 210, the CSCF 220, the CS 230, the MGCF 240, the MSC 250, the HLR 260, the legend 270, and the remote leg 280 of FIG. 2 are shown. In FIG. 4, the first signaling path 272 and the first bearer path 274 are not shown for simplicity. Further, a second signaling path 276 and a second bearer path 278 are shown. The second bearer path 278 may be used to provide the second session between the first mobile device 110 and the second mobile device 160 via the second network after the handover operation is complete. In an embodiment, the control messages exchanged via the second signaling path 276, as described with reference to FIG. 3, and as described further with reference to FIGS. 5-7, may be used to establish the second bearer path 278 from the mobile device 110 to the second mobile device 160. As shown in FIG. 4, the second bearer path 278 may be a path from the first mobile device 110 to the MGW 140 via the second network entity 130 and may include the remote leg 280 that begins at the MGW 140 and terminates at the second mobile device 160. Thus, the handover operation may result in the bearer path for exchanging session information (e.g., voice information for a call) between the first mobile device 110 and the second mobile device being switched from the first bearer path 274 to the second bearer path 278. In an embodiment, the first bearer path 274 and the second bearer path 278 may share a common remote leg, such as the remote leg 280 of FIGS. 2-4. By only switching the bearer paths up to the MGW 140, signaling may not need to be exchanged with the second mobile device 160, thereby simplifying the handover procedure. Additional embodiments describing exemplary control signaling flows that may be used to facilitate the handover of the first session to the second network are described with reference to FIGS. 5-7.

Referring back to FIG. 1, after the first mobile device 110 initiates the second session using the STN received from the CS (e.g., the CS 230 of FIGS. 2-4), resources of the second network may be reserved for providing the second session. For example, a bearer path (e.g., the second bearer path 278 of FIG. 4) from the first mobile device 110 to the MGW 140 may be established via the second network entity 130 and the second network. As explained above with reference to FIGS. 2-4, in an embodiment, the bearer path established for providing the second session may share a common remote leg (e.g., the remote leg 280 of FIGS. 2-4) from the MGW 140 to the second mobile device 160, where the remote leg provides a path from the MGW 140 through the network 150 (e.g., a PSTN network, a second cellular network, etc.) to the second mobile device 160. In an embodiment, a bearer path (e.g., the first bearer path 274 of FIGS. 2 and 3) used to provide the first session (e.g., the Wi-Fi call) may be a packet switched (PS) path, and the bearer path used to provide the second session (e.g., the cellular call after the handover is completed) may be a circuit switched path.

In an embodiment, the CS may be notified or may determine that the resources for providing the bearer path for the second session via the second network have been reserved, and may transmit a trigger to the first mobile device 110 to cause the first mobile device 110 to switch to the bearer path provided via the second network. Additionally, in an embodiment, the CS may provide a trigger to the MGW 140 indicating that the MGW 140 should begin using the bearer path provided via the second network. After the first mobile device 110 and the MGW 140 switch to the bearer path provided via the second network and the second network entity 130, resources used to provide the first session via the bearer path provided via the first network and the first network entity 120 may be released, thereby completing the handover of the first session to the second network.

Thus, the system 100 provides techniques for handover of an active session from a first network to a second network while maintaining voice continuity. For example, by assigning the STN to the CS and then initiating the handover using the STN, infrastructure of the first and second networks (e.g., the second network entity 130, the MGW 140 of FIG. 1 and the MSC 250, the HLR 260, the MGCF 240 and the CSCF 220 of FIG. 2) may easily identify the session that is being handed over from the first network to the second network. This may reduce an amount of time required to complete the handover, thereby providing improved voice continuity during the handover procedure and reducing the likelihood that the first session will be terminated prematurely due to deterioration and/or loss of the connection 124 to the first network.

To illustrate, standards defining the operation of cellular networks suggest that handover operations between a Wi-Fi network and a cellular network (e.g., a code division multiple access (CDMA) cellular network, etc.) should be completed with an audio gap of less than 250 milliseconds (ms) in order for the handover to be imperceptible to the user. The handover techniques of embodiments described herein may provide for an audio gap that is less than 250 ms in accordance with the standards. The handout operations according to embodiments may include a handout preparation phase, a client-side handout execution phase, and a cellular network-side handout execution phase. The handout preparation phase may begin when the first mobile device 110 determines that the handover procedure should be initiated (e.g., when the characteristic of the connection 124 does not satisfy the threshold), and may include activating the second receiving unit. In an embodiment, this may include acquiring a pilot signal from the second network entity 130, acquiring overhead messages transmitted by the second network entity 130, acquire channel information (e.g., channel hashing to acquire an access channel, etc.) for communicating with the second network entity 130, and receiving an indication that the second receiving unit (e.g., the cellular receiving unit) is ready. Upon completing the handout preparation phase, the first mobile device 110 may enter the client-side handout execution phase.

The client-side handout execution phase may include establishing a connection to the second network entity 130. In an embodiment, establishing the connection to the second network entity by the mobile device 110 may include sending a 1× origination message on an acquired access channel, receiving a 1× extended channel assignment message (ECAM) message on a paging channel from the second network entity 130, setting up a traffic channel and transmitting null frames to the second network entity 130, and receiving a 1× service connect message from the second network entity 130. Additionally, the client-side handout execution phase may include completing the connection 134 to the second network via the second network entity 130. In an embodiment, completing the connection 134 to the second network via the second network entity 130 may include sending a service connect completion message to the second network entity 130, receiving a SIP: Info message from the second network entity 130, and sending a an indication from the second receiving unit to the first mobile device 110 "alerting state."

Further, the client-side handout execution phase may include performing the handover of the first session to the second network. In an embodiment, performing the handover of the first session to the second network may be triggered in response to receiving a message from the CS (e.g., the CS 230 of FIGS. 2-4), and in response to receiving the message, the first mobile device 110 may switch the active path for the session from the path provided via the first network and the first network entity 120 (e.g., the first bearer path 274 of FIGS. 2 and 3) to a path provided via the second network and the second network entity 130 (e.g., the second bearer path 278 of FIG. 4), and establishing bi-directional media flow between the first mobile device 110 and the second mobile device 160 via the second network and the second network entity 130. Thus, the first mobile device 110 may complete the handover with an audio gap (e.g., the time required to switch from the first path to the second path) as suggested by the standards for Wi-Fi to cellular handout operations, and may be imperceptible to the user of the first mobile device 110.

The cellular network-side handout execution phase may establish a path from the first mobile device 110 to the MGW 140 via the second network and the second network entity 130 and facilitate the bi-directional media flow on the established path. In an embodiment establishing the bi-directional media flow on the path via the second network may include notifying an MGCF (e.g., the MGCF 240 of FIGS. 2-4) that a session has been initiated via the second network via a message including the STN assigned to the CS, sending a message from the MGCF to the CS to cause the CS to anchor the session being established on the second network, transmitting a message from the CS to the MGCF indicating that the first session will be transferred to the path established through the second network, reserving resources on the MGW 140, notifying an MSC (e.g., the MSC 250 of FIGS. 2-4) serving the second network entity 130 of the path established through the second network, switching the media path at the MGW 140 from the path provided by the first network to the path provided by the second network, and establishing bi-directional media flow on the second network.

Thus, the handover techniques according to embodiments provide a standards based solution for providing handover of a session (e.g., a Wi-Fi call) from the first network (e.g., a Wi-Fi network) to a second network (e.g., a cellular network). By providing a standards based solution, as opposed to a proprietary solution, the handover techniques of embodiments provide a robust handover solution that may be utilized by a downloadable client, or with any mobile device configured according to embodiments and adapted to operate in accordance with the relevant cellular communication standards. Additional aspects message flows for providing handover of an active session from the first network to the second network according to embodiments are described below with reference to FIGS. 5-7.

Figure 5:
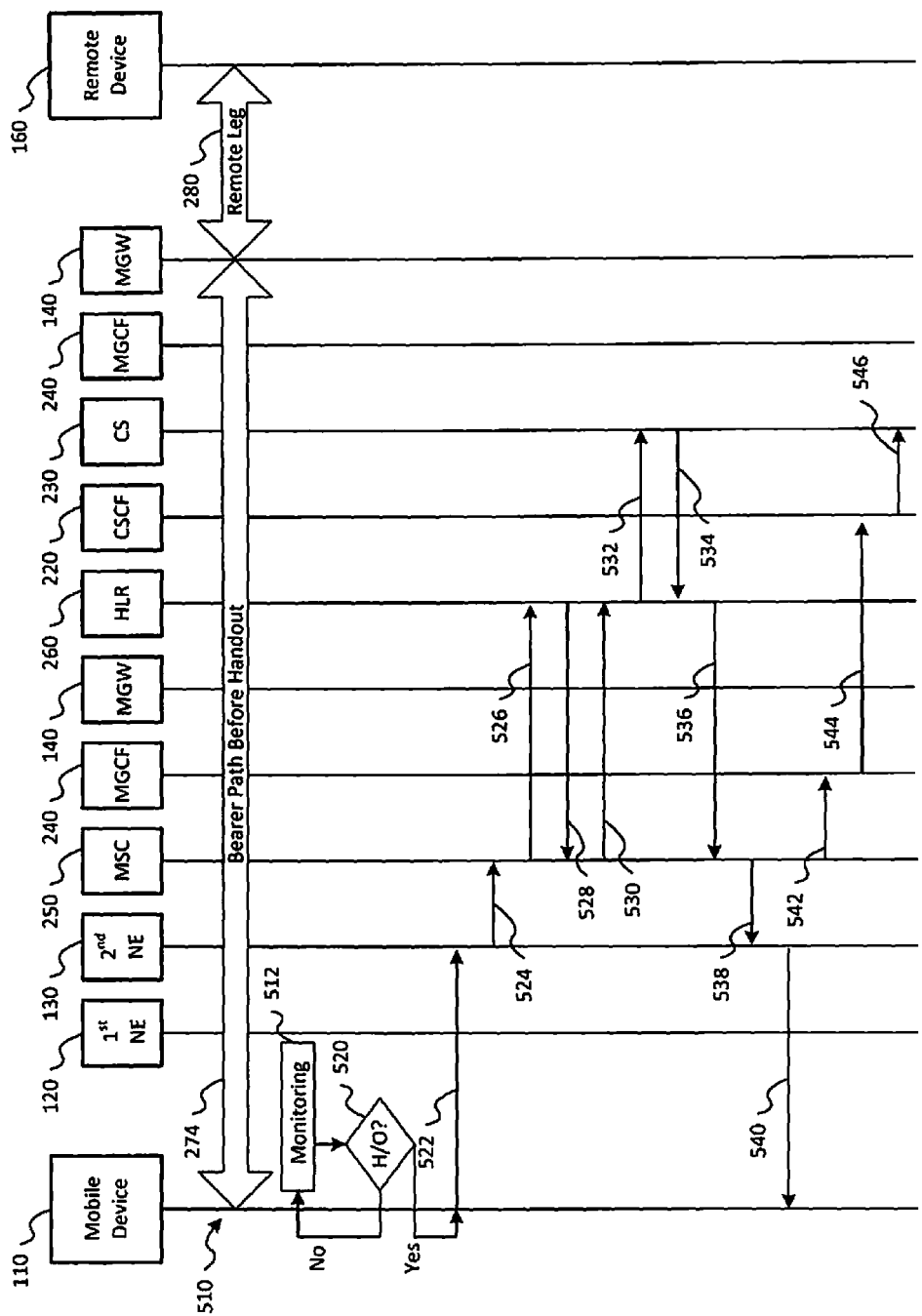
FIG. 5 is a ladder diagram illustrating a message flow for providing handover of an active session from a first network to a second network according to embodiments.

Referring to FIG. 5, a ladder diagram illustrating a first message flow for providing handover of an active session from a first network to a second network according to embodiments is shown. In FIG. 5, the first mobile device 110, the first network entity 120, the second network entity 130, the MGW 140 and the second mobile device 160 of FIG. 1 are shown. Additionally, the CSCF 220, the CS 230, the MGCF 240, the MSC 250, and the HLR 260 are shown. Furthermore, in FIG. 5, a media path 510 is shown and includes the first bearer path 274 between the first mobile device 110 and the MGW 140 and the remote leg 280 between the MGW 140 and the second mobile device 160 of FIGS. 2 and 3 are shown. Thus, in FIG. 5, it is assumed that the first session (e.g., the Wi-Fi call) has been established between the first mobile device 110 and the second mobile device 160 via the media path 510.

As explained above with reference to FIG. 1, upon establishing the connection 124 to the first network via the first network entity 120, the first mobile device 110 may monitor, at flow element 512, a characteristic of the connection 124. At flow element 520, the first mobile device 110 may determine whether to initiate handover operations to switch from the media path to a second media path provided via an alternative network. In an embodiment, the determination of whether to initiate the handover operations may include determining whether the characteristic of the connection 124 satisfies a threshold. In response to a determination that the handover operations are not needed (e.g., when the characteristic of the connection 124 satisfies the threshold), the first mobile device 110 may continue to monitor the characteristic of the connection 124. However, in response to a determination that the handover operations are needed (e.g., when the characteristic of the connection 124 does not satisfy the threshold), the first mobile device 110 may initiate the handover operations, which may include activating a second receiving unit (e.g., a cellular receiving unit) of the first mobile device 110.

For example, at flow element 522, the first mobile device 110 may transmit a message to the second network entity 130. In an embodiment, the message transmitted at flow element 522 may be a call origination message and a called party number (CdPN) of the call origination message may be set to a session transfer number assigned to the CS 230, as described with reference to FIG. 1. At flow element 524, the second network entity 130 may receive the message from the first mobile device 110 and may transmit a message to the MSC 250. In an embodiment, the message transmitted at flow element 524 may be an A1p content management (CM) service request message. At flow element 526, the MSC 250 may receive the message from the second network entity 130 and may transmit a message to the HLR 260. In an embodiment, the message transmitted at flow element 526 may be a mobile application part (MAP) authentication request (AUTHREQ) message. At flow element 528, the HLR 260 may receive the message from the MSC 250 and may transmit a response message to the MSC 250. In an embodiment, the response message may be a MAP authentication request (authreq) response. At flow element 530, the MSC 250 may receive the response message from the HLR 260, and may transmit another message to the HLR 260. In an embodiment, the message transmitted at flow element 528 may be a MAP registration notification (REGNOT) message.

At flow element 532, the HLR 260 may receive the message from the MSC 250 and may transmit a message to the CS 230. In an embodiment, the message transmitted at flow element 532 may be a MAP registration cancel (REG-CANC) message. At flow element 534, the CS 230 may receive the message from the HLR 260 and may transmit a response message to the HLR 260. In an embodiment, the message transmitted at flow element 534 may be a MAP registration cancellation (regcanc) response message. At flow element 536, the HLR 260 may receive the message from the CS 230 and may transmit a message to the MSC 250. In an embodiment, the message transmitted at flow element 536 may be a MAP registration notification (regnot) response message.

At flow element 538, the MSC 250 may receive the message from the HLR 260 and may transmit a message to the second network entity 130. In an embodiment, the message transmitted at flow element 538 may be an A1p assignment request message. At 540, the second network entity 130 may receive the message from the MSC 250 and may transmit a message to the first mobile device 110. In an embodiment, the message transmitted at flow element 540 may be a traffic channel (TCH) assignment message.

At flow element 542, the MSC 250 may transmit a message to the MGCF 240. In an embodiment, the message transmitted at flow element 542 may be an integrated services digital network (ISDN) user part (ISUP) initial address message (IAM), and may include a CdPN set to the STN assigned to the CS 230. Additionally, the message transmitted at flow element 542 may include a calling party number (CgPN) set to a mobile directory number (MDN) of the first mobile device 110. At flow element 544, the MGCF 240 may receive the message from the MSC 250, and may recognize that the CdPN is set to the STN of the CS 230. In response to recognizing that the CdPN is set to the STN of the CS 230, the MGCF 240 may, at flow element 544, transmit a message to the CSCF 220. In an embodiment, the message transmitted at flow element 544 may be a session initiation protocol (SIP) INVITE message and may include the STN, a P-Asserted Identity (PAI) field may be set to the MDN of the first mobile device 110. In an embodiment, the message transmitted at flow element 544 may include session description protocol (SDP) information identifying the MGW 140 as an endpoint for establishing the second session via the second network.

At flow element 546, the CSCF 220 may transmit a message to the CS 230. In an embodiment, the message transmitted at flow element 544 may include session description protocol (SDP) information identifying the MGW 140 as an endpoint for establishing the second session via the second network. For example, in an embodiment, at flow element 546, the CSCF 220 may forward the message transmitted at flow element 544 to the CS 230. The message transmitted at flow element 546 may be a trigger to the CS 230 that the first mobile device 110 has initiated operations to handover the session provided via the media path 510 to a second media path provided via another network. Thus, FIG. 5 illustrates an exemplary message flow for notifying the CS 230 that the first mobile device 110 has initiated handover operations according to embodiments.

Figure 6:
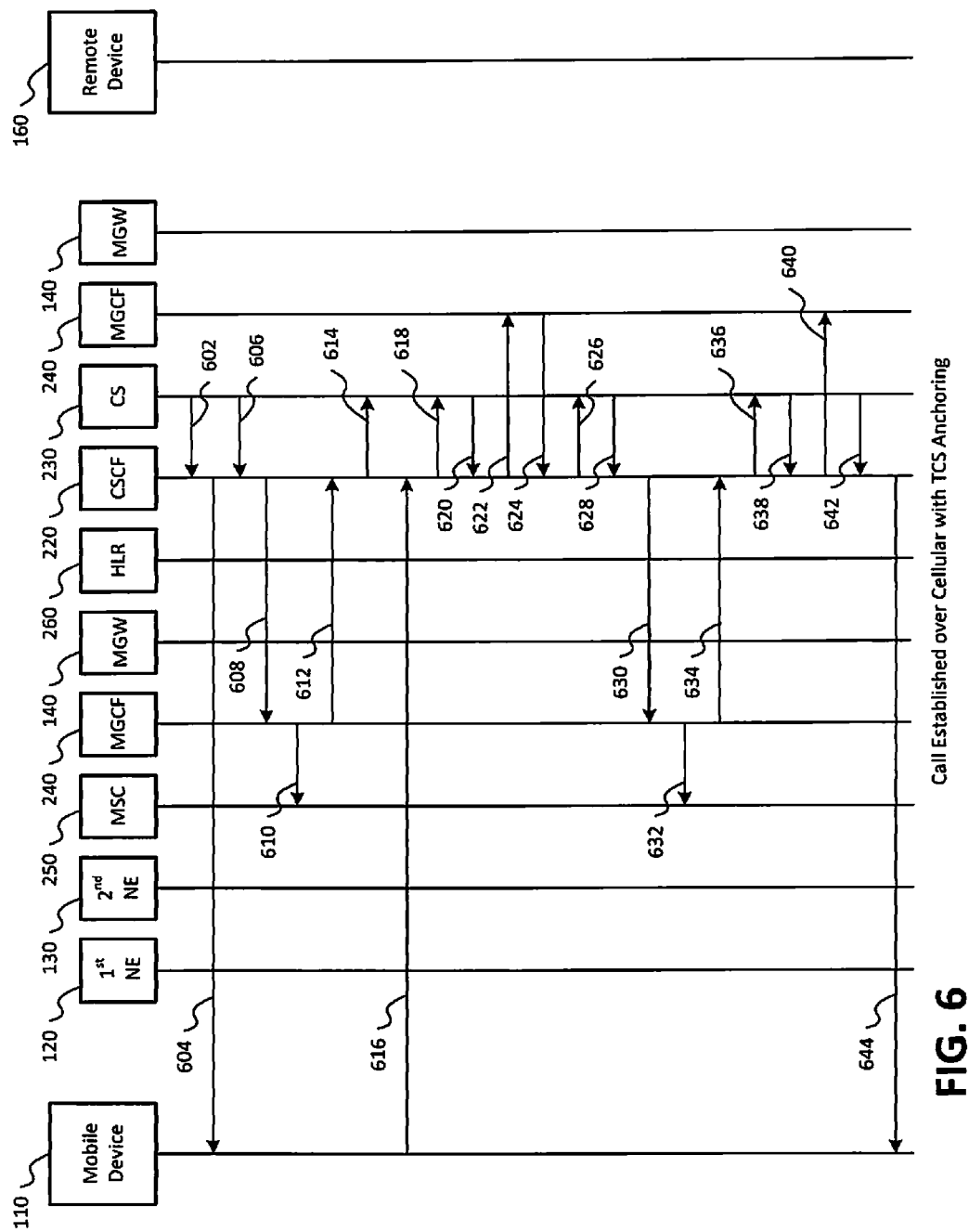
FIG. 6 is a ladder diagram illustrating a message flow for providing handover of an active session from a first network to a second network according to embodiments.

Referring to FIG. 6, a ladder diagram illustrating a second message flow for providing handover of an active session from a first network to a second network according to embodiments is shown. In FIG. 6, the first mobile device 110, the first network entity 120, the second network entity 130, the MGW 140 and the second mobile device 160 of FIG. 1 are shown. Additionally, the CSCF 220, the CS 230, the MGCF 240, the MSC 250, and the HLR 260 of FIGS. 2-4 are shown. It is noted that, in an embodiment, the message flows illustrated in FIG. 6 may occur following completion of the message flows illustrated with reference to FIG. 5.

At flow element 602, the CS 230 may transmit a message to the CSCF 220. In an embodiment, the message transmitted at flow element 602 may be a SIP INFO message. The SIP INFO message transmitted at 602 may facilitate synchronization of the transition of a media (or bearer) path from a first media path (e.g., the media path 510 of FIG. 5) to a second media (or bearer) path (e.g., the media path 710 of FIG. 7). That is to say that the SIP, INFO message transmitted at 602 may be used to synchronize switching the media path through the first network (e.g., the Wi-Fi network provided by the first network entity 120 of FIG. 1) to the media path through a second network (e.g., the cellular network provided by the second network entity 130 of FIG. 1). Synchronizing the switching of the media path using the SIP INFO message may minimize the audio gap, such that it is not perceptible to the user. Additionally, in an embodiment, at flow element 602, the CS 230 may start a handout sync timer that may be used by the CS 230 to determine when to begin handing out the session to the second network. The CSCF 220 may receive the message transmitted at flow element 602, and, at flow element 604, may forward the message to the first mobile device 110. At flow element 606, the CS 230 may transmit a message to the CSCF 220. In an embodiment, the message may be a 183 session progress message. By using a 183 session progress message, the first mobile device 110 may not ring or otherwise notify the user that the second session (e.g., the second call over the cellular network) is being established. Thus, the handover techniques according to an embodiment may provide a handover technique that is transparent to the user of the first mobile device 110. In an embodiment, the message may not include SDP information. At flow element 608, the CSCF 220 may forward the message transmitted from the CS 230 at flow element 606 to the MGCF 240. At flow element 610, the MGCF 240 may transmit a message to the MSC 250. In an embodiment, the message transmitted at flow element 610 may be an ISUP address complete message (ACM). In an embodiment, the message transmitted at flow element 610 may be received by the MSC 250 and may be an acknowledgement of the message transmitted at flow element 542 of FIG. 5 (i.e., that resources for the second session have been reserved and a media path from the first mobile device 110 to the CS 230 via the MGW 140 has been established). It is noted that, at this point in the message flow, the first session is still being provided via the media path 510 of FIG. 5.

At flow element 612, the MGCF 240 may transmit a message to the CSCF 220. In an embodiment, the message transmitted at flow element 612 may be an acknowledgment message (e.g., a SIP 200 OK message). At flow element 614, the CSCF 220 may transmit a message to the CS 230. In an embodiment, the message transmitted at flow element 614 may be a SIP 200 OK message. At flow element 616, the first mobile device 110 may transmit a message to the CSCF 220. In an embodiment, the message transmitted at flow element 616 may be a SIP 200 OK message. At flow element 618, the CSCF 220 may forward the message to the CS 230.

In an embodiment, the handout sync timer started after flow element 602 may expire at a point in the message flow proximate to the occurrence of flow elements 614-618. The expiration of the handout sync timer may server as a trigger to the CS 230 to begin handout of the first session. At flow element 620, the CS 230 may transmit a message to the CSCF 220. In an embodiment, the message transmitted at flow element 620 may be SIP re-INVITE message, and may include a CdPN associated with the second mobile device 160 and SDP information identifying the MGW 140 as the endpoint for handout of the first session to the second network. At flow element 622, the CSCF 220 may forward the message to the MGCF 240. This may notify the MGCF 2240 that the CS 230 is prepared to handout the first session to the second network via a media path established for the second session, as described with reference to FIGS. 4 and 7.

At flow elements 624, 626, 628, and 630, a series of messages may be exchanged between the CSCF 220, the CS 230, and the MGCF 240. In an embodiment, the messages transmitted at flow elements 624, 626, 628, and 630 may be SIP 200 OK messages. At flow element 632, the MGCF 240 may transmit a message to the MSC 250. In an embodiment, the message transmitted at 632 may be an ISUP ANM message and may indicate that the handout is being performed or about to be performed. At flow elements 634, 636, 638, 640, and 642, a series of messages may be exchanged between the MGW 140, the CSCF 220, the CS 230, and the MGCF 240. In an embodiment, the messages transmitted at flow elements 624, 626, 628, and 630 may be SIP ACK messages.

At flow element 644, the CSCF 220 may transmit a message to the first mobile device 110. In an embodiment, the message transmitted at flow element 644 may be a SIP BYE message associated with the first bearer path 274 from the first mobile device 110 to the MGW 140 via the first network and the first network entity 120 (e.g., a Wi-Fi leg of the media path 510). In an embodiment, at this point in the message flow, the second session (e.g., the cellular call) has been established between first mobile device 110 and the second mobile device 160 via the second network. In an embodiment, the CS 230 may be anchoring the second session at this point in the message flow.

Figure 7:
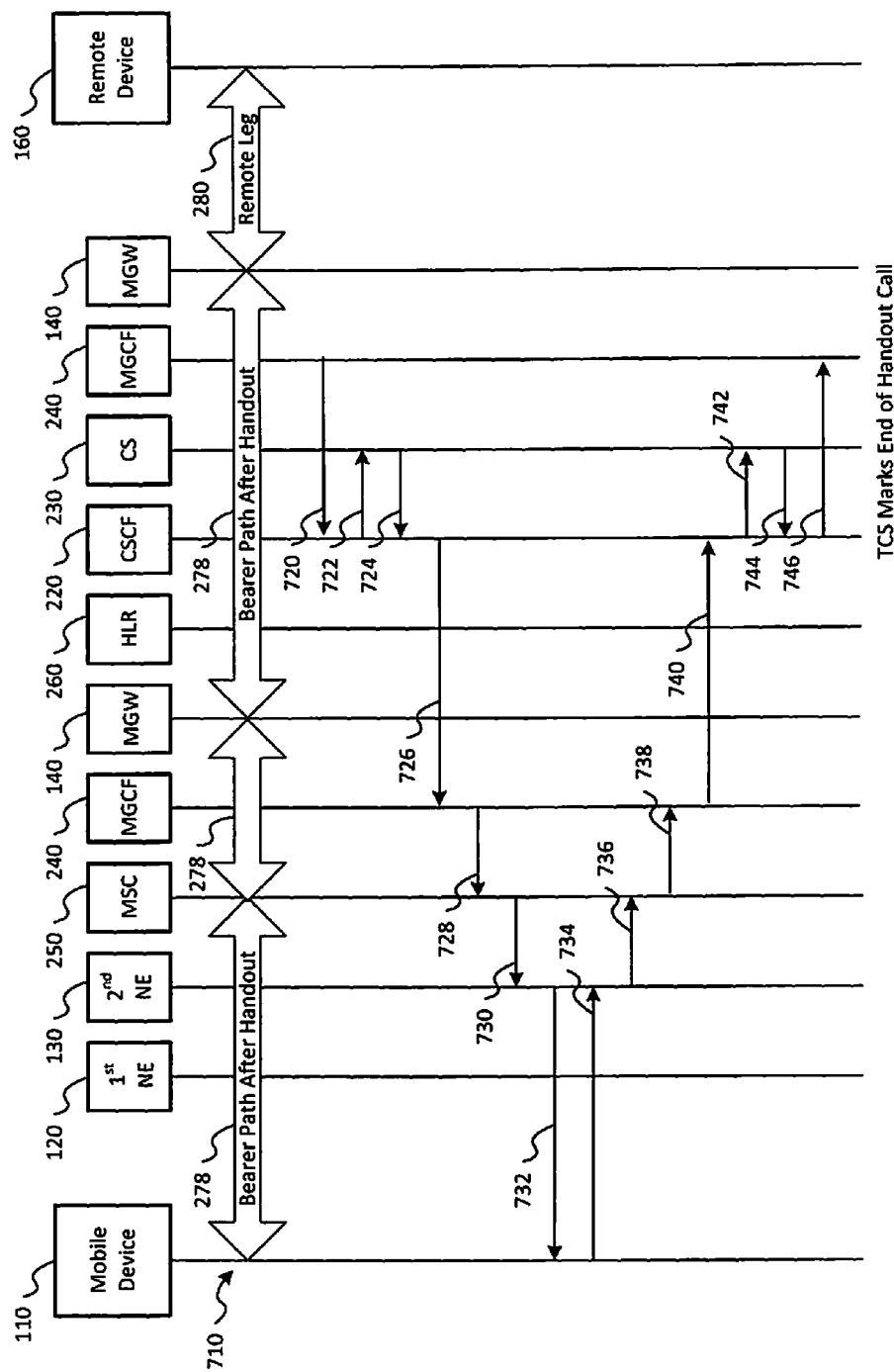
FIG. 7 is a ladder diagram illustrating a message flow for providing handover of an active session from a first network to a second network according to embodiments.

Referring to FIG. 7, a ladder diagram illustrating a third message flow for providing handover of an active session from a first network to a second network according to embodiments is shown. In FIG. 7, the first mobile device 110, the first network entity 120, the second network entity 130, the MGW 140 and the second mobile device 160 of FIG. 1 are shown. Additionally, the CSCF 220, the CS 230, the MGCF 240, the MSC 250, and the HLR 260 of FIGS. 2-4 are shown. It is noted that, in an embodiment, the message flows illustrated in FIG. 7 may occur following completion of the message flows illustrated with reference to FIGS. 5 and 6. In an embodiment, establishing the second session via the second network may result in a second media path 710. As shown in FIG. 7, the second media path may include the second bearer path 278 of FIG. 4 and the remote leg 280 of FIGS. 2-4.

At flow element 720, the MGCF 240 may transmit a message to the CSCF 220. In an embodiment, the message transmitted at flow element 720 may be a SIP BYE message. At flow element 722, the CSCF 220 may forward the message to the CS 230. In an embodiment, this may notify the CS 230 that the MGW 140 is prepared to complete the handout operations. At flow element 724, the CS 230 may transmit a message to the CSCF 220. In an embodiment, the message transmitted at flow element 724 may be a SIP BYE message, and may indicate to the CSCF 220 that the CS 230 is prepared to complete the handout operations. At flow element 726, the CSCF 220 may transmit a message to the MGCF 240. In an embodiment, the message transmitted at flow element 726 may be a SIP BYE message. At flow element 728, the MGCF 240 may transmit a message to the MSC 250. In an embodiment, the message may be a ISUP release (REL) message and may indicate that the second session has been established via the second network (e.g., the second media path 710) and is ready for the handout.

At flow element 730, the MSC 250 may transmit a message to the second network entity 130. In an embodiment, the message transmitted at 730 may be an A1p Clear Command. At flow element 732, the second network entity 130 may transmit a message to the first mobile device 110. In an embodiment, this may be a 1× release message. At flow element 734, the first mobile device 110 may transmit a message to the second network entity 130. In an embodiment, the message may be a 1× release complete message. At flow element 736, the second network entity 130 may transmit a message to the MSC 250. In an embodiment, the message transmitted at 736 may be an A1p Clear Complete message. At flow element 738, the MSC 250 may transmit a message to the MGCF 240. In an embodiment, the message transmitted at flow element 738 may be an ISUP release complete (RLC) message. At flow element 740, 742, 744, and 746, the messages may be exchanged between CSCF 220, the CS 230, and the MGCF 240. In an embodiment, the messages may be SIP 200 OK messages.

At the conclusion of the message flow illustrated in FIG. 7, the CS 230 marks the end of the first session and no longer serves the first mobile device. Thus, at the conclusion of the message flow illustrated in FIG. 7, the handover of the first session to the second network may be completed. It is noted that the exemplary embodiments of message flows described with reference to FIGS. 5-7 have been provided for purposes of illustration, rather than by way of limitation, and that other types of messages and other message transmission orders and arrangements may be used to achieve the handover operations according to embodiments. Thus, the present disclosure is not to be limited to the specific exemplary embodiments of message flows illustrated in FIGS. 5-7.

Referring to FIGS. 8A and 8B, exemplary embodiments of a user interface that may be presented to a user of a mobile device during a handover of a session from a first network to a second network according to embodiments are shown. As shown in FIGS. 8A and 8B, the first mobile device 110 may include a display 802. The display 802 may be used to present information associated with an active session (e.g., an active Wi-Fi call, an active multimedia streaming session, etc.) to a user of the first mobile device 110.

For example, in FIG. 8A, an embodiment illustrating a technique for providing the user of the first mobile device 110 with an indication as to whether an active call is a Wi-Fi call or a cellular call is shown. As shown in FIG. 8A, a first selectable control may be presented at the display 802 and may include text 804 indicating that the current session is a Wi-Fi call. As explained above with reference to FIG. 1, the first mobile device 110 may determine whether to initiate a handover of the session from a first network (e.g., a Wi-Fi network) to a second network (e.g., a cellular network). In response to a decision to perform the handover operations, as indicated by the arrow 820, the first mobile device 110 may initiate the handover operations (e.g., the handover operations described with reference to FIGS. 1-7). As shown in FIG. 8A, the information presented at the display 802 may not change while the handover operation is initiated. After the handover operation is completed, as indicated by the arrow 830, the first selectable control may be updated to present information 806 that indicates that the call is no longer a Wi-Fi call. Thus, in an embodiment, outside of changing the text presented in association with the first selectable control, the handover may be transparent to the user and may not require any actions to be performed by the user of the first mobile device 110.

In FIG. 8B, another embodiment of a technique for providing the user of the first mobile device 110 with an indication as to whether an active call is a Wi-Fi call or a cellular call is shown. In FIG. 8B, the first selectable control of FIG. 8A is shown and includes text 810 indicating that the user may select the first selectable control to end the call. Additionally, in FIG. 8B, an icon 812 is presented at the display 802 and indicates that the call is a Wi-Fi call. While the session is active, and as explained above with reference to FIG. 1, the first mobile device may determine whether to initiate a handover of the session from a first network (e.g., a Wi-Fi network) to a second network (e.g., a cellular network). In response to a decision to perform the handover operations, as indicated by the arrow 820, the first mobile device 110 may initiate the handover operations (e.g., the handover operations described with reference to FIGS. 1-7). As shown in FIG. 8B, the information presented at the display 802 (e.g., the text 810 and the icon 812) may not change while the handover operation is initiated. After the handover operation is completed, as indicated by the arrow 830, the text 810 presented in association with the first selectable control may remain the same, but the icon 812 may be replaced with an icon 814, where the icon 814 indicates the call is a cellular call. Thus, in an embodiment, outside of changing the icons presented in connection with whether the call is a Wi-Fi call or a cellular call, the handover may be transparent to the user and may not require any actions to be performed by the user of the first mobile device 110.

In an additional or alternative embodiment, the indication of whether a call is a Wi-Fi call or a cellular call may be provided via text (e.g., the text 804, 806) presented at the display 802 in connection with the first selectable control and via icons (e.g., the icons 812, 814). In yet another additional or alternative embodiment, because the handover procedure according to embodiments is transparent to the user of the first mobile device 110, the user may not be provided with an indication of whether the call is being provided via a first network (e.g., a Wi-Fi network) or a second network (e.g., a cellular network).

Figure 9:
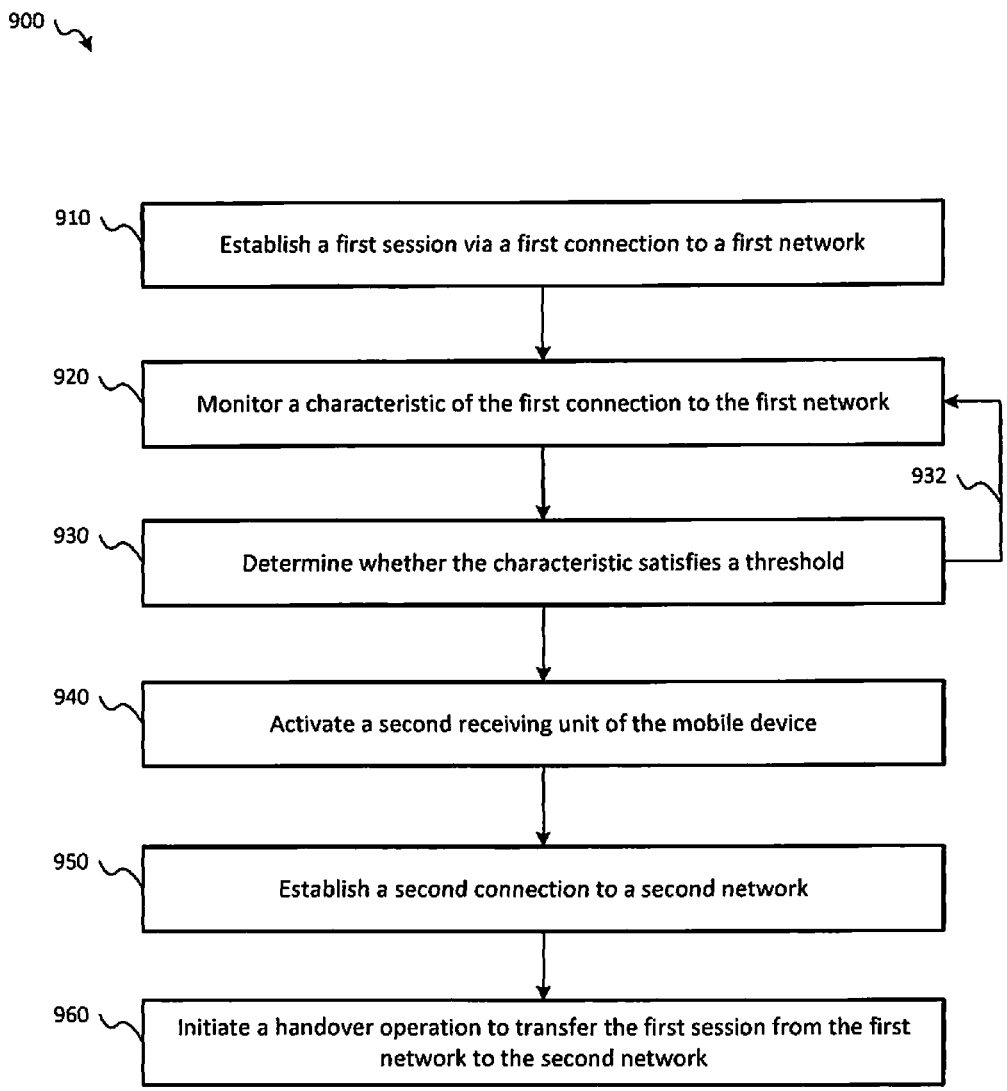
FIG. 9 is a flowchart of a method for performing a handover of an active session from a first network to a second network according to embodiments.

Referring to FIG. 9, a flowchart of a method for performing a handover of an active session from a first network to a second network according to embodiments is shown as a method 900. In an embodiment, the method 900 may be performed by the first mobile device 110. At 910, the method 900 includes establishing a first session via a first connection to a first network. In an embodiment, the connection to the first network may be the connection 124 of FIG. 1 and may be provided by a first receiving unit of the mobile device. At 920, the method 900 includes monitoring a characteristic of the first connection to the first network. In an embodiment, the characteristic may be associated with a received signal strength indication (RSSI) associated with the first network, a bit error rate (BER) associated with the first network, a link quality indicator (LQI) associated with the first network, a data rate provided by the first network, or a combination thereof.

At 930, the method 900 includes determining whether the characteristic satisfies a threshold. In response to a determination that the characteristic does not satisfy the threshold, the method 900 may include, at 940, activating a second receiving unit of the mobile device, and, at 950, establishing a second connection to a second network. In an embodiment, the second connection to the second network may be provided by the second receiving unit of the mobile device. In an embodiment, activating the second receiving unit may include providing operational power to the second receiving unit, providing operational power to a transmitter of the second receiving unit, processing signals received from the second network by the second receiving unit, or a combination thereof. At 960, the method 900 includes initiating a handover operation to transfer the first session from the first network to the second network. In an embodiment, the handover operation may include one or more of the operations described with reference to FIGS. 1-7. Additionally, the method 900 may include continuing to monitor the characteristic of the first connection to the first network in response to a determination that the characteristic satisfies the threshold, as indicated by the arrow 932.

The method 900 of embodiments may provide technique for handing out a session from a first network (e.g., a Wi-Fi network) to a second network (e.g., a cellular network) that may be transparent to a user of the mobile device. Additionally, the method 900 may reduce the likelihood that the session is terminated prior to completing the handover. For example, the method 900 may enable handover completion prior to the mobile device losing the connection to the first network. Additionally, the method 900 may provide handover of the session from the first network to the second network with an audio gap of less than 250 ms using a standards based approach. Thus, the method 900 may be readily integrated and used by an standards based mobile device configured according to embodiments or with a downloadable client, thereby enabling deployment of the handover techniques of embodiments at a reduced cost, and with reduced configuration requirements (e.g., different types of mobile devices do not require different configurations). Additionally, in an embodiment, the method 900 provides a solution that reduces battery consumption of the mobile device (e.g., because the second receiving unit or a portion thereof may be deactivated until the characteristic fails to satisfy the threshold).

Although the present disclosure and its advantages have been described in detail, it should be understood that various changes, substitutions and alterations can be made herein without departing from the scope of the embodiments of the present disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the present disclosure, processes, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. A method comprising:
   establishing, by a mobile device, a first session via a first connection to a first network, said first network being a wireless fidelity (Wi-Fi) network and wherein the connection to the first network is provided by a first receiving unit of the mobile device;
   receiving address information upon establishing the first session, said address information including a session transfer number associated with a convergence server;
   determining a set of characteristics of the first connection to the first network to monitor during the first session, said set of characteristics being based on a type of the first session and including a plurality of characteristics, said plurality of characteristics including at least two of the following: a bit error rate (BER) associated with the first network, a link quality indicator (LQI) associated with the first network, and a data rate provided by the first network;
   determining a set of thresholds corresponding to the set of characteristics associated with the type of the first session;
   monitoring, by the mobile device, said set of characteristics of the first connection to the first network;
   determining, by the mobile device, whether the set of characteristics satisfies the set of thresholds; and
   in response to a determination that the set of characteristics do not satisfy the set of thresholds:
   activating, by the mobile device, a second receiving unit of the mobile device;
   establishing, by the mobile device, a second connection to a second network, wherein the second connection to the second network is provided by the second receiving unit of the mobile device; and
   initiating, by the mobile device, a handover operation to transfer the first session from the first network to the second network, said initiating the handover operation including initiating a second session via the second connection to the second network, the second session being established based on the address information received upon establishing the first session.

2. The method of claim 1, wherein activating the second receiving unit includes providing operational power to the second receiving unit.

3. The method of claim 1, wherein activating the second receiving unit includes providing operational power to a transmitter of the second receiving unit.

4. The method of claim 1, wherein the first session is a voice over Wi-Fi (VoWiFi) call, and wherein the second network is a cellular network.

5. The method of claim 1, wherein the first session is provided via a first bearer path from the mobile device to a remote device, wherein the second session is provided via a second bearer path from the mobile device to the remote device.

6. The method of claim 5, wherein the first bearer path includes a packet switched path, and wherein the second bearer path includes a circuit switched path.

7. The method of claim 5, wherein the first bearer path and the second bearer path include a remote leg that is common to both the first bearer path and the second bearer path.

8. The method of claim 1, wherein the threshold value for one or more characteristics of the set of characteristics is different for different session types.

9. The method of claim 1, wherein the method includes deactivating the second receiving unit of the mobile device in response to establishing the first connection to the first network, wherein the second receiving unit is adapted to communicate with the second network, and wherein the second receiving unit is different from the first receiving unit, said first receiving unit being adapted to communicate with the first network.

10. The method of claim 9, wherein deactivating the second receiving unit includes deactivating transmission logic of the second receiving unit, and wherein the second receiving unit remains operational to receive signals from the second network after the transmission logic is deactivated.

11. The method of claim 10, wherein the method includes:
   storing information representative of a characteristic of the signals received from the second network; and determining whether to activate the transmission logic of the second receiving unit based at least in part on whether the information representative of the characteristic of the signals received from the second network satisfy a second threshold, wherein the transmission logic of the second receiving unit is adapted to transmit signaling for establishing the second connection.

12. The method of claim 11, wherein the characteristic of the signals received from the second network includes at least one of: a received signal strength indication (RSSI) associated with the second network, a bit error rate (BER) associated with the second network, and a link quality indicator (LQI) associated with the second network.

13. The method of claim 1 further comprising: refraining from notifying the user of the mobile device that the second session is being established during said handover operation.

14. The method of claim 13 further comprising: displaying information indicating a change in the network being used by the mobile device upon completion of said handover operation.

15. The method of claim 1, wherein said handover operation provides for an audio gap that is less than 250 milliseconds.

16. The method of claim 15, wherein a SIP INFO message is used to synchronize switching a first media path of the first session through the first network to a second media path through the second network.

17. The method of claim 1, wherein prior to establishing, by the mobile device, the second connection to the second network, initiating operations to determine whether said second network is available, said operations to determine whether said second network is available including accessing information representative of a characteristic of a previous connection between the mobile device and a network entity of the second network to determine whether the characteristic satisfies a threshold.

18. The method of claim 1,
wherein one or more thresholds of said set of thresholds is a value that indicates the connection to the first network provides a minimum quality of service with respect to the first session, and
wherein at least one threshold of said set of thresholds is configured to have different values based on the session type of the first session.

19. An apparatus comprising:
a first receiving unit;
a second receiving unit;
a memory; and
a processor configured to:
establish a first session via a first connection to a first network, said first network being a wireless fidelity (Wi-Fi) network and wherein the connection to the first network is provided by the first receiving unit;
receive address information upon establishing the first session, wherein the address information includes a session transfer number associated with a convergence server;
determine a set of characteristics of the first connection to the first network to monitor during the first session, said set of characteristics being based on a type of the first session and including a plurality of characteristics, said plurality of characteristics including at least two of the following: a bit error rate (BER) associated with the first network, a link quality indicator (LQI) associated with the first network, a data rate provided by the first network,
determine a set of thresholds corresponding to the set of characteristics associated with the type of the first session, said thresholds of the set of thresholds corresponding to the set of characteristics being configurable;
monitor said set of characteristics of the first connection to the first network;
determine whether the set of characteristics satisfies the set of thresholds; and
in response to a determination that the set of characteristics do not satisfy the set of thresholds:
activate the second receiving unit;
establish a second connection to a second network, wherein the second connection to the second network is provided by the second receiving unit; and
initiate a handover operation to transfer the first session from the first network to the second network by initiating a second session via the second connection to the second network, wherein the second session is established based on the address information received upon establishing the first session.

20. The apparatus of claim 19, wherein activating the second receiving unit includes at least one of providing operational power to the second receiving unit, providing operational power to a transmitter of the second receiving unit, and processing signals received from the second network by the second receiving unit.

21. The apparatus of claim 19, wherein the first session is a voice over Wi-Fi (VoWiFi) call, and wherein the second network is a cellular network.

22. The apparatus of claim 19, wherein said apparatus is a mobile device, wherein the first session is provided via a first bearer path from the mobile device to a remote device, wherein the second session is provided via a second bearer path from the mobile device to the remote device, wherein the first bearer path includes a packet switched path, wherein the second bearer path includes a circuit switched path, and wherein the first bearer path and the second bearer path include a remote leg that is common to both the first bearer path and the second bearer path.

23. The apparatus of claim 19, wherein the processor is configured to deactivate the second receiving unit in response to establishing the first connection to the first network, wherein second receiving unit is adapted to communicate with the second network.

24. The apparatus of claim 19, wherein said apparatus is a mobile device that refrains from notifying the user of the mobile device that the second session is being established during said handover operation.

25. A non-transitory computer-readable storage medium storing instructions that, when executed by a processor, cause the processor to perform operations comprising:
establishing a first session via a first connection to a first network, said first network being a wireless fidelity (Wi-Fi) network and wherein the connection to the first network is provided by a first receiver of a mobile device;
receiving address information upon establishing the first session, said address information including a session transfer number associated with a convergence server;
determining a set of characteristics of the first connection to the first network to monitor during the first session, said set of characteristics being based on a type of the first session and including a plurality of characteristics, said plurality of characteristics including at least two of the following: a bit error rate (BER) associated with the first network, a link quality indicator (LQI) associated with the first network, and a data rate provided by the first network;
determining a set of thresholds corresponding to the set of characteristics associated with the type of the first session;
monitoring said set of characteristics of the first connection to the first network;
determining whether the set of characteristics satisfies the set of thresholds; and
in response to a determination that the set of characteristics do not satisfy the set of thresholds:
   activating a second receiving unit of the mobile device;
   establishing a second connection to a second network, wherein the second connection to the second network is provided by the second receiving unit of the mobile device; and
   initiating handover operations to transfer the first session from the first network to the second network, said initiating handover operations including initiating a second session via the second connection to the second network, the second session being established based on the address information received upon establishing the first session.

26. The non-transistory computer-readable storage medium of claim 25, wherein the first session is a voice over Wi-Fi (VoWiFi) call, wherein the second network is a cellular network, and wherein the handover operations include handing the Wi-Fi call over to the cellular network.

27. The non-transistory computer-readable storage medium of claim 25, wherein activating the second receiving unit includes at least one of providing operational power to the second receiving unit, providing operational power to a transmitter of the second receiving unit, and processing signals received from the second network by the second receiving unit.

28. The non-transistory computer-readable storage medium of claim 25, wherein the operations include deactivating the second receiving unit in response to establishing the first connection to the first network, wherein second receiving unit is adapted to communicate with the second network.

29. The non-transistory computer-readable storage medium of claim 28, wherein deactivating the second receiving unit includes deactivating transmission logic of the second receiving unit, and wherein the second receiving unit remains operational to receive signals from the first network after the transmission logic is deactivated.

\* \* \* \* \*